United States Patent
Vercier et al.

(10) Patent No.: US 12,332,080 B2
(45) Date of Patent: Jun. 17, 2025

(54) METHOD FOR CALIBRATING THE DIFFERENCE IN STIFFNESS AND/OR QUADRATURE OF A VIBRATING INERTIAL SENSOR

(71) Applicant: THALES, Courbevoie (FR)

(72) Inventors: Nicolas Vercier, Valence (FR); Nicolas Martin, Valence (FR)

(73) Assignee: THALES, Courbevoie (FR)

( * ) Notice: Subject to any disclaimer, the term of this patent is extended or adjusted under 35 U.S.C. 154(b) by 170 days.

(21) Appl. No.: 18/029,890

(22) PCT Filed: Oct. 8, 2021

(86) PCT No.: PCT/EP2021/077960
§ 371 (c)(1),
(2) Date: Mar. 31, 2023

(87) PCT Pub. No.: WO2022/078917
PCT Pub. Date: Apr. 21, 2022

(65) Prior Publication Data
US 2023/0366701 A1  Nov. 16, 2023

(30) Foreign Application Priority Data
Oct. 14, 2020 (FR) .................................. 2010492

(51) Int. Cl.
*G01C 25/00* (2006.01)
*G01C 19/574* (2012.01)

(52) U.S. Cl.
CPC ......... *G01C 25/005* (2013.01); *G01C 19/574* (2013.01)

(58) Field of Classification Search
CPC ............................ G01C 25/005; G01C 19/574
See application file for complete search history.

(56) References Cited

U.S. PATENT DOCUMENTS

2006/0020409 A1   1/2006  Schroeder
2015/0177272 A1*  6/2015  Clark ................... G01P 15/097
                                                          73/514.32

(Continued)

FOREIGN PATENT DOCUMENTS

EP        2 960 625 A1    12/2015

OTHER PUBLICATIONS

Vercier, et al., "A new Silicon axisymmetric Gyroscope for Aerospace Applications", 2020 DGON Inertial Sensors and Systems (ISS), 2020.

(Continued)

*Primary Examiner* — Lisa M Caputo
*Assistant Examiner* — Cynthia L Davis
(74) *Attorney, Agent, or Firm* — BakerHostetler (57) ABSTRACT

A method for calibrating the stiffness mismatch ΔK or quadrature Kxy of a vibrating angular sensor includes a resonator extending about two axes x and y defining a sensor frame xy, comprising a vibrating proof mass comprising two parts configured to vibrate in phase opposition; and detection, excitation, quadrature compensation and stiffness adjustment transducers; and a stiffness matrix $K_O$ in the wave frame; the method comprising steps of: A determining the electrical angle; B recovering a quadrature or stiffness term of the stiffness matrix $K_O$ in the wave frame, the term being a sum of functions in cos(iθ) and sin(iθ); C determining the amplitudes of the functions in cos(iθ) and sin(iθ); then D determining the stiffness mismatch ΔK or the quadrature Kxy, on the basis of the amplitudes.

11 Claims, 4 Drawing Sheets

(56) References Cited

U.S. PATENT DOCUMENTS

| | | | |
|---|---|---|---|
| 2015/0192415 A1* | 7/2015 | Ge | G01C 19/5776 73/504.13 |
| 2016/0202060 A1* | 7/2016 | Liu | G01C 19/5776 73/504.12 |
| 2018/0245946 A1 | 8/2018 | Weinberg et al. | |

OTHER PUBLICATIONS

Tatar, et al., "Quadrature-Error Compensation and Corresponding Effects on the Performance of Fully Decoupled MEMS Gyroscopes", Journal of Microelectromechanical Systems, vol. 21, Issue: 3, pp. 656-667, Jun. 2012.

Kacem, et al., "M/NEMS resonant sensors and nonlinear phenomena", Acoustics & Techniques, vol. 57, pp. 10-14, 2009.

* cited by examiner

METHOD FOR CALIBRATING THE DIFFERENCE IN STIFFNESS AND/OR QUADRATURE OF A VIBRATING INERTIAL SENSOR

CROSS-REFERENCE TO RELATED APPLICATIONS

This application is a National Stage of International patent application PCT/EP2021/077960, filed on Oct. 8, 2021, which claims priority to foreign French patent application No. FR 2010492, filed on Oct. 14, 2020, the disclosures of which are incorporated by reference in their entirety.

FIELD OF THE INVENTION

The field of the invention is that of vibrating inertial sensors in which at least two masses are vibrated, or even a single mass comprising at least two parts, one mass or one part of the mass being able to deform with respect to the other. The invention relates to such at least one-mass inertial vibrating sensors comprising one or more stiffness correction transducers (also referred to as stiffness trimming transducers) and one or more quadrature correction transducers (also referred to as quadrature trimming transducers). Non-limitingly the invention in particular relates to MEMS inertial sensors able to have a planar structure, for example sensors micro-machined in a wafer. The invention more specifically relates to a method for calibrating the stiffness mismatch and/or the quadrature of a vibrating inertial sensor.

BACKGROUND

Vibrating (or tuning-fork) inertial sensors are known to those skilled in the art. A vibrating inertial sensor comprises a resonator, which may or may not be axisymmetric, associated with means for vibrating the resonator and with means for detecting an orientation of the vibration (vibration wave) with respect to a sensor frame. These means generally comprise at least two groups of actuators secured to the casing of the sensor and/or the resonator and at least two groups of detectors also secured to the casing and/or the resonator.

For the sake of simplicity, the expressions "inertial sensor", "angular sensor" and indeed just "sensor" have been used interchangeably throughout the present description to refer to a vibrating inertial sensor.

Such a sensor is arranged on a carrier in order to measure values of the angle and/or angular velocity of said carrier. The carrier may be all or part of an airplane, boat, train or any other air, land or sea vehicle.

Inertial sensors micro-machined in a thin planar wafer, and making it possible to measure an angular position (gyroscope) or an angular velocity (gyrometer), are in particular known, such sensors notably being described in the document EP2960625. The main features thereof are recalled below.

The fabrication of these micro-machined sensors, which are also referred to as MEMS sensors (MEMS being the acronym of Micro-Electro-Mechanical Systems), uses wafer-scale micro-machining techniques, etching techniques, doping techniques, deposition techniques, etc., that are similar to those used to fabricate electronic integrated circuits, allowing production costs to be kept low.

The MEMS sensors described in patent application EP2960625 consist of two vibrating proof masses M1 and M2 (illustrated in FIG. 1) that are arranged one about the other (concentric) and that are excited to vibrate in a tuning-fork mode in the plane of the wafer (xy plane in FIG. 1) via one or more excitation transducers. The two masses are suspended from fixed anchor points A of the wafer by suspension springs RS. The two masses are coupled together by stiffness elements RC. The aim is to obtain, by construction, a stiffness along x that is equal to a stiffness along y, and a zero coupling stiffness between x and y. The useful vibration mode corresponds to a linear vibration of the two masses in phase opposition.

More generally, more than two proof masses may be employed. For example, four proof masses may be used, or conversely a single mass comprising at least two parts, one being able to deform with respect to the other, as for example in a micro hemispherical resonator gyroscope (µHRG).

The structure described in patent application EP2960625 forms a resonant system (referred to as a "resonator") based on two masses that are coupled together by Coriolis acceleration. When the sensor rotates about the z axis perpendicular to the xy plane, the z axis being denoted the "sense axis", combination of the forced vibration with the angular-rotation vector generates, through the Coriolis effect, forces that set the proof masses into natural vibration perpendicular to the excitation vibration and to the sense axis; the amplitude of the natural vibration is proportional to the speed of rotation. Electronics associated with the sensor compute the amplitude of the vibration in the direction orthogonal to the direction of excitation, whatever the latter is (known by assumption).

The sensor may operate in gyrometer mode: the direction of excitation is kept fixed by modifying the excitation, and consequently the axis perpendicular to this vibration is kept fixed with respect to the casing of the sensor, and the output information is then an image of the required energy that must be applied to the excitation transducers to keep the direction of natural vibration fixed despite the movements of the casing. Measurement of this counterforce allows the angular velocity $\Omega$ of the sensor to be determined.

The sensor may also operate in gyroscope mode: the direction of the excitation vibration is left free and is detected to give the angular orientation of the sensor. It is also possible to deduce the angular velocity of the sensor by differentiating the angle measurement.

The term "angular orientation" and the term "angle" are interchangeable.

Figure 1:
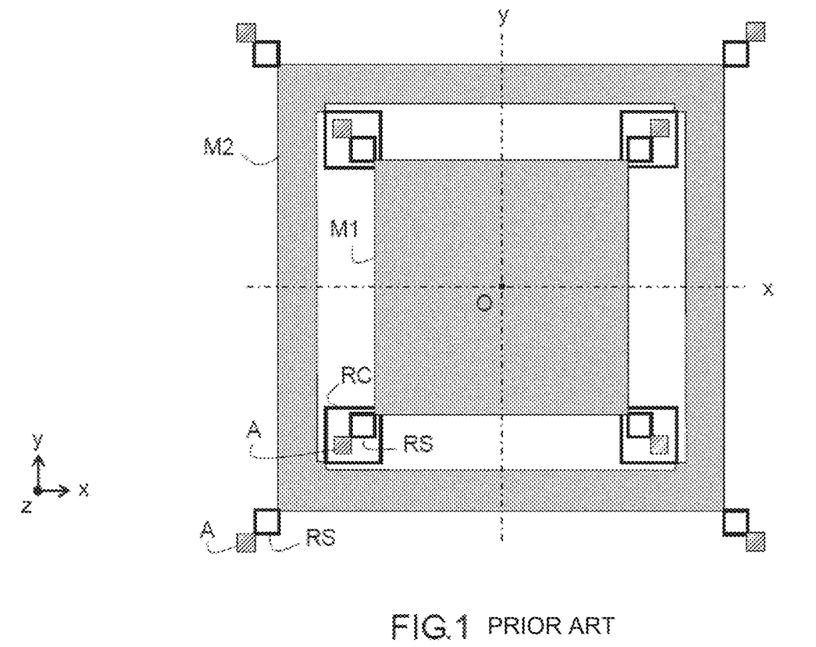
FIG. 1 (already cited) illustrates the axisymmetric resonator of a MEMS sensor according to the prior art, this sensor being based on two vibrating proof masses arranged one about the other.

The whole of the structure of the resonator described in patent application EP2960625 is axisymmetric about two axes x and y defining a sensor frame such as illustrated in FIG. 1. By axisymmetric, what is meant is that the structure is symmetric about x and symmetric about y. However, it will be understood that this definition may cover any possible minor asymmetry. As described below, these axes constitute the main directions of actuators/detectors that operate along these two axes.

Figure 2:
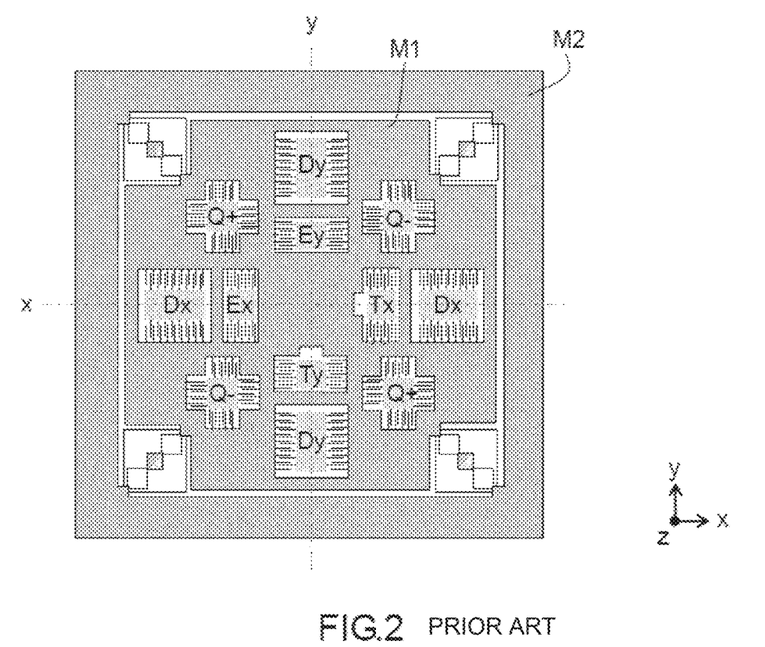
FIG. 2 (already cited) illustrates the structure of a MEMS sensor according to the prior art with a resonator that is axisymmetric about two axes x and y defining a sensor frame.

To excite the useful vibration mode in any given direction of the plane, the excitation signal is decomposed into two components of adjusted respective amplitudes, which are applied to the excitation transducer Ex acting along the direction x and to the excitation transducer Ey acting along the direction y, respectively, said transducers being associated with at least one proof mass (inner mass M1 in FIG. 2). Excitation forces are therefore applied to these transducers in order to generate and sustain the vibrating wave: said transducers are able to sustain the forced vibration via an amplitude command Ca (to oppose the damping of the sensor) and in any direction of the plane xy, via a precession command Cp (to cause the wave to rotate).

The movements of the resulting wave are detected by combining the information gathered by at least one pair of detection transducers Dx, Dy that acquire the position of the mass during its travel in the sensor frame xy (two pairs in FIG. 2) and that are associated with at least one proof mass.

Figure 3:
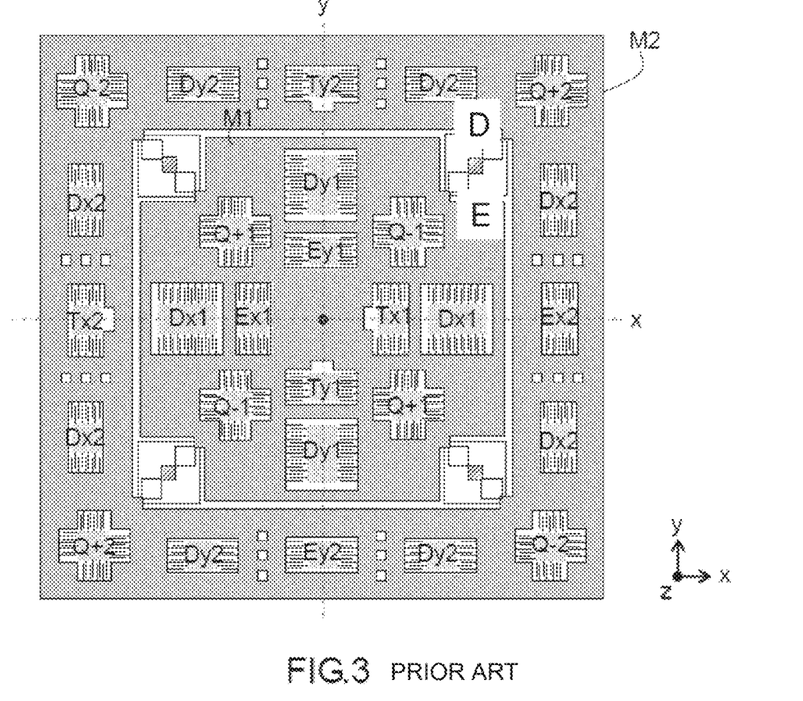
FIG. 3 (already cited) illustrates a MEMS sensor according to the prior art with transducers on both masses.

Preferably, transducers are produced on the two masses, as illustrated in FIG. 3, the index 1 corresponding to the mass M1 and the index 2 to the mass M2. FIGS. 2 and 3 are examples of non-limiting arrangements: many other types of arrangement are possible, these moreover not necessarily being axisymmetric.

The transducers are preferably interdigitated comb electrodes, gap variation being sensed. There is one fixed comb, the teeth of which are secured to a fixed mass of the machined wafer, and one mobile comb, the teeth of which, which are interdigitated with the teeth of the fixed comb, are secured to the proof mass associated with the transducer in question.

Excitation consists in applying an excitation force via an AC voltage between the mobile comb and the fixed comb, at the desired vibration frequency (frequency of mechanical resonance of the suspended proof mass, which is typically of the order of a few kHz). The movement produced is perpendicular to the teeth of the comb.

Detection consists in applying a bias voltage between the fixed comb and the mobile comb and in observing the variations in charge which result from the capacitance variations, between the fixed comb and the mobile comb, due to the variations in spacing between the teeth of the fixed comb and of the mobile comb. The measured movement is the movement perpendicular to the teeth of the comb. Alternatively, in another configuration, the movement longitudinally to the teeth of the combs may be measured.

The vibrating assembly of masses/springs is characterized by a symmetric 2×2 stiffness matrix, denoted K. For optimal operation of the sensor, it is sought to obtain a final stiffness matrix proportional to an identity matrix. Due to manufacturing imperfections, this is generally not the case (see below).

The axis x' is denoted the vibration axis of the wave. This axis defines a frame x'y', with y' perpendicular to x' in the plane of the sensor. The axis x' makes to the axis x an angle θ denoted the "electrical angle" and the frame x'y' is called the "wave frame".

It will be assumed at present that the wave vibrates along x (x'=x).

The dynamic equation describing a vibrating inertial sensor may be reduced to a model of a single mass of mass M, the movement X, Y of which is modeled as follows:

$$M\begin{bmatrix} \ddot{X} \\ \ddot{Y} \end{bmatrix} + A\begin{bmatrix} \dot{X} \\ \dot{Y} \end{bmatrix} + K\begin{bmatrix} X \\ Y \end{bmatrix} + C\begin{bmatrix} \dot{X} \\ \dot{Y} \end{bmatrix} = \begin{bmatrix} FX \\ FY \end{bmatrix}$$ [Math. 1]

where M is the mass matrix (below, for the sake of simplicity, it will be considered to be a scalar), A is the damping matrix, K is the stiffness matrix and C is the Coriolis matrix.

The Coriolis matrix C is:

$$\begin{bmatrix} 0 & -M\Omega \\ M\Omega & 0 \end{bmatrix}$$ [Math. 2]

where M is the mass and Ω is the angular velocity of the sensor.

FX and FY are the excitation forces applied along the axis x and the axis y of the sensor. These forces result from commands Cr, Ca, Cq and Cp that are computed in the wave frame by servos in a way known to those skilled in the art, on the basis of demodulation of detected signals relative to the movement of the vibration. On the basis of measurements of the movement X and Y of the wave, which measurements are taken in the frame xy, a rotation is applied to pass to the wave frame x'y', then the commands are determined (via a demodulation of detected signals) and an inverse rotation is applied to pass back to the sensor frame xy, in which the excitation forces are applied. The commands are determined so that the movement of the mass, i.e. the vibration wave of the sensor, takes a desired form. Ideally, the desired waveform is an oscillating linear movement in a given direction with respect to the frame xy of the sensor. However, the wave is generally of elliptical shape, though substantially flat in the direction perpendicular to the given direction (in other words the minor axis of the ellipse is very small relative to the major axis, which major axis corresponds to the given direction).

The command Cr corresponds to stiffness forces used to control the natural frequency of the resonator; as phase is equal to the integral of frequency, Cr therefore controls the phase of the wave. Cr is an external force applied to the resonator (on estimation of its movement), which modifies the frequency of the vibration, by slowing down or speeding up vibration when the resonator is vibrating, but which does not modify the intrinsic stiffness of the resonator.

The command Ca corresponds to forces that are of an amplitude such as to compensate for the effect of the damping forces of the sensor, and to keep the amplitude of the vibration constant: it therefore allows the amplitude of the wave to be controlled.

The command Cp corresponds to precession forces, allowing the angular velocity of the wave to be controlled. In the case of a sensor operating in gyrometer mode, a precession command Cp is applied so as to servocontrol the orientation of the vibration (or electrical angle) to a constant setpoint value.

The command Cq corresponds to quadrature forces used to control the quadrature of the wave, i.e. to guarantee the linearity of the wave or, when the wave is elliptical, to control the minor axis of the ellipse.

It is well known to those skilled in the art, as in particular described in the publication *"Capteurs résonants M/NEMS et phénomènes non linéaires"* [MEMS/NEMS resonant sensors and non-linear effects] (Najib Kacem et al. *Acoustique & Techniques*, no. 57), that imperfections in the manufacture of the sensor, and in particular asymmetries in its mass or non-linearities of mechanical or electrostatic origin, lead to errors in the information output therefrom. Most of these imperfections must be compensated for by balancing the vibrating inertial sensor.

It is known to carry out this compensation by removing material locally, for example by laser ablation, so as to modify the distribution of mass or of stiffness. This process is expensive or even impossible to implement on a sensor micro-machined in a thin silicon wafer, the detection and excitation movements of which occur in the plane of the substrate.

A first type of imperfection resulting in non-identity of the stiffness matrix K is the stiffness mismatch between the main axis of vibration and the axis perpendicular to the vibration in the plane of the sensor, corresponding to a system stiffness matrix in which the stiffness along the axis x is different from the stiffness along the axis y. It is sought to equalize the stiffness along the two aforementioned axes by means of an adjustable electrostatic stiffness. This electrostatic stiffness, which is called the equalization stiffness, is delivered by stiffness adjustment transducers Tx, Ty (at least one pair Tx/Ty on at least one mass, as illustrated in FIG. 2) acting in the directions x and y. The aim of the application of said equalization stiffness is to equalize the stiffnesses along the two axes of the vibration, by reducing the value of the highest stiffness, thus making the frequencies equal. This stiffness correction is referred to as "stiffness trimming".

A second type of imperfection originates from mechanical coupling between the axis of the vibration and the perpendicular axis, resulting in what is referred to as quadrature bias. It is a question of anisotropy defects in the dynamic stiffness of the set of two vibrating masses (or two parts of one mass) that result in a vibration that is no longer linear but rather elliptical, corresponding to the existence of a non-zero coupling stiffness. One known prior-art solution is to cancel out this term by applying a (sinusoidal) force F to the system via excitation transducers. The problem is that this force is not necessarily applied at exactly the right time (phase errors) and along the correct axis (gain error), giving rise to drift. To avoid application of a force F, the coupling term may be physically canceled not by applying a force but by changing the stiffness of the resonator directly via at least one pair of transducers Q+ and Q− as illustrated in FIG. 2 (2Q+/Q− pairs in FIG. 2). These transducers operating along the axes x and y are arranged on diagonals, to respect symmetry and for reasons of space. This quadrature correction is referred to as "quadrature trimming" or "quadrature trim". The transducers Tx, Ty, Q+ and Q− are preferably also interdigitated combs, as illustrated in FIGS. 2 and 3, these combs being controlled using DC voltages and being referred to as "trimming combs".

Thus, the quadrature "trim" transducers modify the characteristics of the MEMS sensor to eliminate coupling between the two axes of the sensor frame, and the stiffness "trim" transducers modify the characteristics of the MEMS sensor to eliminate stiffness mismatch between the two axes of the sensor frame. They modify the intrinsic characteristics of the resonator. In other words, if the trimming voltage is adjusted, even when the resonator is not vibrating, the stiffness of the resonator changes, in contrast to the command Cr described above, which is a force that slows down or speeds up the vibration when the resonator is vibrating.

The trimming transducers are controlled by trim servos (which are known to those skilled in the art, in particular from the publication "*Quadrature-Error Compensation and Corresponding Effects on the Performance of Fully Decoupled MEMS Gyroscopes*" (Erdinc Tatar et al. Journal of Microelectromechanical Systems, vol. 21, no. 3, June 20), which servos generate a quadrature trim command CTq, a stiffness trim command along x CTx and a stiffness trim command along y CTy. The trim commands are DC voltages.

Thus, via the trimming combs, the stiffness matrix K is modified directly using a matrix Kt, and the dynamic equation of the vibrating inertial sensor is:

$$M\begin{bmatrix}\ddot{X}\\\ddot{Y}\end{bmatrix}+A\begin{bmatrix}\dot{X}\\\dot{Y}\end{bmatrix}+K\begin{bmatrix}X\\Y\end{bmatrix}+C\begin{bmatrix}\dot{X}\\\dot{Y}\end{bmatrix}-Kt\begin{bmatrix}X\\Y\end{bmatrix}=\begin{bmatrix}FX\\FY\end{bmatrix}$$ [Math. 3]

The comb for trimming stiffness along x modifies the stiffness of the resonator by generating a matrix Kt:

$$Kt=\begin{bmatrix}Kx & 0\\0 & 0\end{bmatrix}$$ [Math. 4]

The comb for trimming stiffness along y modifies the stiffness of the resonator by generating a matrix Kt:

$$Kt=\begin{bmatrix}0 & 0\\0 & Ky\end{bmatrix}$$ [Math. 5]

The quadrature trimming comb modifies the stiffness of the resonator by generating a matrix Kt:

$$Kt=\begin{bmatrix}0 & Kxy\\Kxy & 0\end{bmatrix}$$ [Math. 6]

The stiffnesses Kx, Ky and Kxy correspond to the commands CTx, CTy and CTq (DC voltages) to within a gain factor. The commands CTx, CTy and CTq are voltages that, through the combs, modify the stiffnesses Kx, Ky and Kxy. Applying the trimming commands amounts to modifying the matrix K in the differential equation Math. 1, by converting K into K−Kt.

Figure 4:
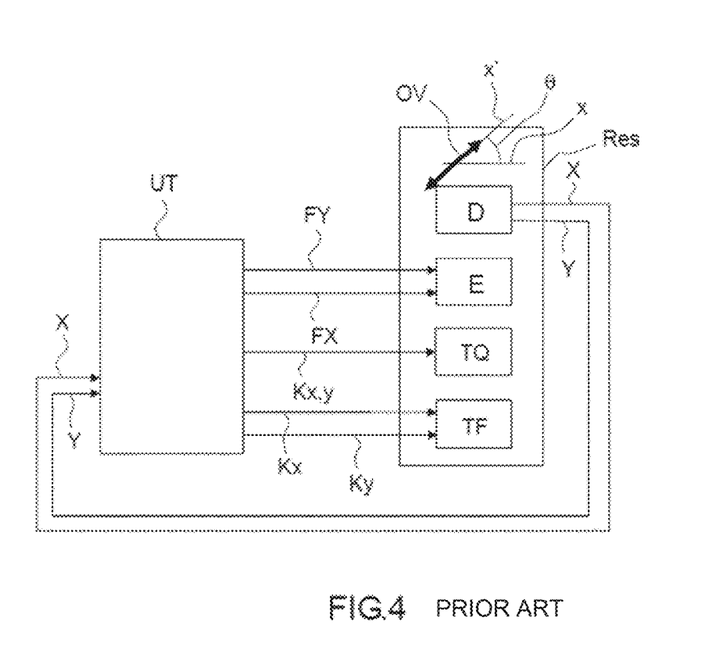
FIG. 4 (already cited) illustrates the operation of an inertial sensor according to the prior art.

FIG. 4 illustrates the general operation of an inertial sensor according to the prior art. The resonator Res comprises the various transducers described above and symbolized by E (excitation), D (detection), TQ (quadrature trim) and TF (stiffness trim). The vibration wave OV vibrates along x' with an electrical angle θ. A processing unit UT performs the various servo computations and generates, in respect of corrections, all of the commands/forces Cr, Ca, Cq and Cp mentioned above in relation to the various transducers. As explained below, the excitation and trimming commands are determined by different servos.

In the processing unit, the movements X and Y detected in the sensor plane are first of all transformed into the wave frame x'y' by a rotation through the electrical angle θ, and then the excitation commands are determined in the wave frame by servos in the form of electrical voltages U'x and U'y with, for example:

$$U'_x=iC_a+C_r;\text{ and}$$ [Math. 7]

$$U'_y=iC_p+C_q$$ [Math. 8]

In addition to the excitation servos, first and second servos are used to generate the stiffness trimming commands CTx, CTy and quadrature trimming commands CTq, respectively, which commands are thus determined by dedicated servos.

All the commands are then transposed to the sensor frame xy via an inverse rotation, then applied (to within a gain factor) in this sensor frame to the various transducers.

Vercier N et al.: "A new Silicon axisymmetric Gyroscope for Aerospace Applications", 2020 DGON Inertial Sensors and Systems (ISS), IEEE (2020) discloses that angular velocity errors are corrected by a rotation of the wave and that stiffness and quadrature errors are corrected by trimming. One problem is that residual stiffness mismatches Kx−Ky, also referred to as ΔK, and residual quadrature mismatches Kxy remain, despite the stiffness and quadrature trimming commands applied to counter the detected errors. Furthermore, the stiffness and quadrature trimming commands may themselves generate a stiffness mismatch and quadrature, even if these are smaller than the mismatch that it is sought to cancel out. In particular, the trimming transducers, which are preferably also interdigital combs, themselves induce electrostatic non-linearities that induce errors in the stiffness matrix, even though these errors are smaller than the stiffness errors of mechanical origin that these transducers are meant to correct.

Thus, when it is desired to correct a stiffness mismatch $\Delta K$ by applying a trimming command of $-\Delta K$, there remains a residual stiffness mismatch $\varepsilon_1 K$ that may be generated by the trimming itself. If it is desired to allow for this mismatch, it must be known. After correction of $\varepsilon_1 K$, there may remain a new residual mismatch $\varepsilon_2 K$ again induced by the correction and which may be negligible or at least acceptable, where $$\Delta K \gg \varepsilon_1 K \gg \varepsilon_2 K \qquad \text{[Math. 9]}$$

The problem is the same when it is desired to correct quadrature by applying a trimming command—Kxy—there remains a residual quadrature $\varepsilon_1 Kxy$ that may be generated by the trimming itself. After correction of $\varepsilon_1 Kxy$, there may remain a new residual quadrature $\varepsilon_2 Kxy$ again induced by the correction and which may be negligible or at least acceptable, where $$Kxy \gg \varepsilon_1 Kxy \gg \varepsilon_2 Kxy \qquad \text{[Math. 10]}$$

However, in a vibrating inertial sensor, stiffness mismatch and quadrature, when coupled with phase errors, may cause the sensor to drift. It will be recalled here that excitation phase errors are errors that exist between the forces estimated by the excitation servos and the forces actually applied to the resonator (excitation matrix representative of the effect of the imperfect excitation chain). Similarly, detection phase errors are errors that exist between the actual movements of the resonator and the estimated movements (detection matrix representative of the effect of the imperfect detection chain).

The general problem of the invention is to minimize the stiffness mismatch and the quadrature of a vibrating inertial sensor in order to decrease sensor drift as much as possible.

Known solutions generally use intrusive trimming techniques to find the stiffness mismatch (or quadrature), these in particular involving application of disturbances. For example, patent application US20060020409A1 describes a method for identifying stiffness mismatches requiring disturbances to be applied to measure them. More precisely, the described principle is to apply a sinusoidal disturbance to the quadrature loop which, coupled with the stiffness mismatch, generates a precession of the wave. Using a loop, it is sought to cancel the impact of the disturbance on the precession of the wave by decreasing the amplitude of the disturbance in the precession, this allowing the stiffness mismatch to be determined. However, such a method creates a disturbance in the useful signal, often inside the bandwidth of interest. Thus, it generates residual lines at the applied frequencies, and this therefore forms a parasitic signal. Moreover, the method exploits a loop employing a servo-controlled voltage, this making it sensitive to phase errors and increasing noise.

SUMMARY OF THE INVENTION

The invention aims to overcome the aforementioned drawbacks of the prior art.

More particularly, it aims to provide a method for identifying the stiffness mismatch and quadrature of a vibrating inertial sensor, in order to correct them in the sensor, preferably in real time, and without disturbing the sensor with a disturbance that could end up in the measurement delivered by the sensor.

A first subject of the invention allowing these drawbacks to be overcome is a method for calibrating the stiffness mismatch $\Delta K$ and/or the quadrature Kxy of a vibrating inertial angular sensor, the inertial sensor comprising a resonator extending about two mutually perpendicular axes x and y defining a sensor frame xy and comprising:

at least one vibrating proof mass, said at least one proof mass comprising at least two parts configured to vibrate in phase opposition with respect to each other at a vibration angular frequency $\omega$ and in a direction x' defining a wave frame x'y', the vibration wave along x' making an electrical angle $\theta$ to the axis x;

a plurality of electrostatic transducers controlled by electrical voltages and operating along the two axes x or y, including at least:

a pair of detection transducers configured to detect the movements of the vibration wave along the two axes x and y;

a pair of excitation transducers to which excitation forces are applied along the two axes x and y, respectively, via a plurality of excitation commands determined by servos on the basis of the detected movements, these being configured to maintain the wave at a constant amplitude via an amplitude command and, where appropriate, to rotate said vibration wave via a precession command;

a pair of quadrature compensation transducers, controlled via a quadrature command; and a pair of stiffness adjustment transducers, controlled via a stiffness command setting stiffness along the axis x and a stiffness command setting stiffness along the axis y, respectively, forming a stiffness command;

the resonator having a stiffness matrix $K_C$ in the sensor frame and a stiffness matrix $K_O$ in the wave frame;

the calibrating method being applied when the inertial sensor is in operation with a vibration wave vibrating along the axis x';

the calibrating method comprising the steps of:

A determining the electrical angle $\theta_k$, $\theta(t)$;

B recovering at least one term of the stiffness matrix $K_O$ in the wave frame x'y', which may be a quadrature term $K_O(2,1)$ or a stiffness term $K_O(1,1)$, said term taking the form of a sum of functions in $\cos(i\theta)$ and $\sin(i\theta)$, i being an integer varying between 1 and n, n being greater than or equal to 1;

steps A and B being reiterated either for a plurality of electrical angles $\theta_k$, where k is an integer varying between 1 and m, m being greater than or equal to 2, or for a duration T during which the vibration wave rotates continuously through an electrical angle $\theta(t)$ varying as a function of time t; then C determining the amplitudes of the functions in $\cos(i\theta)$ and $\sin(i\theta)$; and D determining the stiffness mismatch $\Delta K$ and the quadrature Kxy, respectively, on the basis of the determined amplitudes.

The calibrating method according to the invention may further comprise one or more of the following features, taken alone or in any possible technical combination.

According to one embodiment, the electrical angle describes a plurality of electrical angles $\theta_k$ where k is an integer varying between 1 and m, m being greater than or equal to 2, and step C of determining amplitudes comprises applying a least squares filter to the recovered term, the quantity m of electrical angles $\theta_k$ being at least equal to the number of amplitudes to be determined.

According to an alternative embodiment, the vibration wave continuously rotates through an electrical angle $\theta(t)$ varying as a function of time t for a duration T, and step C of determining amplitudes comprises demodulating the recovered term in $\cos(i\theta)$ and $\sin(i\theta)$ for each i varying between 1 and n, so as to determine the amplitudes of the functions in $\cos(i\theta)$ and $\sin(i\theta)$; and step D of determining the stiffness mismatch $\Delta K$ and the quadrature Kxy, respectively, is carried out on the basis of the determined amplitudes.

According to one embodiment, the inertial sensor operates in gyrometer mode, the electrical angle determined in step A being equal to an imposed angle set via the precession command.

According to an alternative embodiment, the inertial sensor operates in gyroscope mode, the electrical angle resulting from a rotation of the inertial sensor being measured by said inertial sensor, potentially superimposed on a precession command, the electrical angle determined in step A being equal to said measured angle of rotation.

According to one embodiment, the calibrating method further comprises an additional step of:
E applying a stiffness command and a quadrature command, respectively, on the basis of the stiffness mismatch $\Delta K$ and the quadrature Kxy determined in step D, respectively.

According to a particular embodiment, steps A to E are included in a closed loop servo or are implemented in open loop iteratively, and preferably twice.

A second subject of the invention is an inertial angular sensor comprising a resonator extending about two mutually perpendicular axes x and y defining a sensor frame xy, and comprising:
at least one vibrating proof mass, said at least one proof mass comprising at least two parts configured to vibrate in phase opposition with respect to each other at a vibration angular frequency $\omega$ and in a direction x' defining a wave frame x'y', the vibration wave along x' making an electrical angle $\theta$ to the axis x;
a plurality of electrostatic transducers controlled by electrical voltages and operating along the two axes x or y, including at least:
a pair of detection transducers configured to detect the movements of the vibration wave along the two axes x and y;
a pair of excitation transducers to which excitation forces are applied along the two axes x and y, respectively, via a plurality of excitation commands determined by servos on the basis of the detected movements, these being configured to maintain the wave at a constant amplitude via an amplitude command and, where appropriate, to rotate said vibration wave via a precession command;
a pair of quadrature compensation transducers, controlled via a quadrature command; and
a pair of stiffness adjustment transducers, controlled via a stiffness command setting stiffness along the axis x and a stiffness command setting stiffness along the axis y, respectively, thus forming a stiffness command,
the resonator having a stiffness matrix $K_C$ in the sensor frame and a stiffness matrix $K_O$ in the wave frame;
the inertial angular sensor further comprising:
a means for determining the electrical angle $\theta_k$, $\theta(t)$;
a means for recovering at least one term of the stiffness matrix $K_O$ in the wave frame x'y', which may be a quadrature term $K_O(2,1)$ or a stiffness term $K_O(1,1)$; and
a processing unit configured to implement at least steps A to D, and optionally step E, of the calibrating method according to the invention;
the stiffness adjustment transducers and quadrature compensation transducers, respectively, being configured to apply said stiffness command and said quadrature command, respectively, to the resonator.

According to a particular embodiment, the inertial sensor is axisymmetric.

According to one particular embodiment, which may be combined with the previous particular embodiment, the inertial sensor comprises at least two vibrating proof masses forming the at least two parts configured to vibrate in phase opposition with respect to each other. One proof mass may be arranged about another proof mass.

A third subject of the invention is a method for measuring an angular velocity or an angular orientation of a carrier on which is arranged an inertial sensor according to the invention, the measuring method comprising:
calibrating said inertial sensor by implementing the calibrating method according to the invention; and
measuring angular velocity or angular orientation,
the inertial sensor being used in gyrometer mode or in gyroscope mode.

The calibrating method, the inertial sensor and the measuring method according to the invention may comprise any of the aforementioned features, taken alone or in any technically possible combination with other features.

The following description presents a number of examples of embodiment of the calibrating device according to the invention: these examples do not limit the scope of the invention. These examples of embodiment contain not just essential features of the invention but also additional features related to the embodiments in question.

BRIEF DESCRIPTION OF THE FIGURES

Other features, details and advantages of the invention will become apparent on reading the description given with reference to the appended drawings, which are given by way of example and which show, respectively.

In all of these figures, identical references may designate identical or similar elements.

In addition, the various parts shown in the figures are not necessarily shown to a uniform scale, to make the figures more readable.

DETAILED DESCRIPTION

The calibrating method according to the invention applies to an inertial angular sensor comprising a resonator Res associated with means for vibrating the resonator and with means for detecting an orientation of the vibration (vibration wave) with respect to a frame of the sensor, for example excitation transducers E and detection transducers D, which are controlled with excitation commands (E), and trimming transducers TF and TQ controlled with trim commands (TF, TQ).

The invention may in particular be applied to one of the sensors presented above, in connection with FIGS. 1 to 3, or to sensors according to the variants also described above (at least one mass or at least two masses, axisymmetric or non-axisymmetric sensor, planar or non-planar structure, the MEMS sensor being one example of embodiment).

Furthermore, reference may also be made to the general operation of FIG. 4, the processing unit UT being configured to apply the steps of the method according to the invention. It may be a question of one or more modules added to the UT with a view to performing the steps of the calibrating method according to the invention.

The vibration wave OV vibrates at an angular frequency of vibration ω. The calibrating method according to the invention is applicable to an inertial sensor operating in gyrometer mode or in gyroscope mode, the excitation commands being servo-controlled in operation accordingly.

In a vibrating inertial angular sensor, in particular one that is axisymmetric, there are two frames: the sensor frame xy the axes x and y of which are the axes containing the excitation and detection transducers of the sensor, and the wave frame x'y' in which the axis x' is the axis of vibration of the wave OV and the axis y' is the axis perpendicular to x' in the plane of the sensor. The axis x' makes to the axis x an angle θ denoted the "electrical angle" and the frame x'y' is called the "wave frame".

In a vibrating inertial angular sensor, a source of drift is generated by stiffness or quadrature errors multiplied by phase errors. It will be recalled that a stiffness error corresponds to a stiffness mismatch between the vibration axis and the axis perpendicular to the vibration, and that a quadrature error results from mechanical coupling between the axis of the vibration and the axis perpendicular to the vibration.

A vibrating inertial angular sensor including trimming transducers possesses actuators that allow stiffness and quadrature corrections to be made. However, there remain residual stiffness mismatches ΔK and/or residual quadratures Kxy, despite the stiffness and quadrature trim commands.

One objective of the invention is to eliminate, or at least decrease to values acceptable to the operator, stiffness mismatch and quadrature, so as to make the sensor less or even more sensitive to phase errors.

The calibrating method according to the invention may be applied to an inertial angular sensor operating in gyrometer mode, or may be applied to an inertial sensor operating in gyroscope mode. In the case of a gyroscope, each angle θ is an angle measured or experienced (as a result of the change in angle of the carrier), whereas with a gyrometer, the angle θ is set via a wave rotation command. Both in gyrometer mode and in gyroscope mode, the method according to the invention requires a plurality of different angles θ to be used.

A vibrating gyrometer possesses a stiffness matrix having the following form $K_C$ in the sensor frame (given here without/before use of trimming commands):

$$K_C = \begin{bmatrix} Kx & Kxy \\ Kxy & Ky \end{bmatrix}$$ [Math. 11]

where Kx, Ky are the stiffnesses along the axes x and y in the sensor frame and Kxy is the quadrature in the sensor frame.

The stiffness matrix $K_O$ in the wave frame (making an angle θ to the sensor frame) is given by:

$$K_O = \begin{bmatrix} K + (\Delta K)\cos(2\theta) - (Kxy)\sin(2\theta) & (\Delta K)\sin(2\theta) + (Kxy)\cos(2\theta) \\ (\Delta K)\sin(2\theta) + (Kxy)\cos(2\theta) & K - (\Delta K)\cos(2\theta) + (Kxy)\sin(2\theta) \end{bmatrix}$$ [Math. 12]

$$K = \frac{Kx + Ky}{2}$$ [Math. 13]

$$\Delta K = \frac{Kx - Ky}{2}$$ [Math. 14]

With the trimming commands TFx, TFy (stiffness) and TQ (quadrature), the stiffness matrix $K_C$ is modified directly using a trimming matrix Kt in the sensor frame, where:

$$K_t = \begin{bmatrix} Ktx & Kq \\ Kq & Kty \end{bmatrix}$$ [Math. 15]

The matrix K then becomes $K_{mod}$ in the sensor frame:

$$K_{mod} = K_C - K_t = \begin{bmatrix} Kx - Ktx & Kxy - Kq \\ Kxy - Kq & Ky - Kty \end{bmatrix}$$ [Math. 16]

where Ktx, Kty are the corrections of the stiffness trimming transducers, and Kq is the correction of the quadrature transducers. These corrections are expressed in the sensor frame. According to the invention, it is sought to eliminate stiffness mismatch and to decrease quadrature to zero; therefore, the matrix Kt is sought that will make $K_{mod}$ a matrix proportional to the identity matrix, i.e. such that:

$$K_{mod} = \begin{bmatrix} Kx_{mod} & 0 \\ 0 & Kx_{mod} \end{bmatrix}$$ [Math. 17]

When the sensor is in operation, i.e. when it is being servo-controlled, it is possible to measure the quadrature term in the wave frame, which is represented by the term $K_O(2,1)$, that is:

$$K_O(2,1) = K_O(1,2) = (\Delta K)\sin(2\theta) + (Kxy)\cos(2\theta)$$ [Math. 18]

It is also possible to measure the stiffness term corresponding to the frequency along the wave axis x', which is represented by the term $K_O(1,1)$, that is:

$$K_O(1,1) = K + (\Delta K)\cos(2\theta) - (Kxy)\sin(2\theta) \quad \text{[Math. 19]}$$

It follows from the last two equations that if $\Delta K$ and $Kxy$ were fixed terms, $\Delta K$ (and $Kxy$) could be determined simply through measurement of a value of the quadrature term $K_O(2,1)$ (and/or of the stiffness term $K_O(1,1)$) for at least two electrical angles.

The problem is that a vibrating gyrometer generally uses electrostatic transducers that generate non-linearities, meaning that the terms K, Kxy and $\Delta K$ are not fixed but also dependent on the electrical angle $\theta$, this making it difficult to identify the mismatch $\Delta K$, and Kxy.

Thus, the stiffness matrix may be expressed in the following form, in the sensor frame:

$$K_C = \begin{bmatrix} \sum_i Aic.\cos(i\theta) + \sum_i Cic.\cos(i\theta) + \\ Ais.\sin(i\theta) \quad Cis.\sin(i\theta) \\ \sum_i Dic.\cos(i\theta) + \sum_i Bic.\cos(i\theta) + \\ Dis.\sin(i\theta) \quad Bis.\sin(i\theta) \end{bmatrix} \quad \text{[Math. 20]}$$

where i is an integer varying between 1 and n, n being greater than or equal to 1, and Aic, Ais, Bic, Bis, Cic, Cis, Dic, Dis are values that vary with temperature slowly with respect to the corrections made and that may therefore be considered constants, some of which may be zero. The terms Kx, Ky and Kxy are therefore more complex and depend on the electrical angle $\theta$.

In other words, each term of the stiffness matrix is composed of a sum of cosine and sine harmonics that are dependent on the electrical angle $\theta$. In other words, these sinusoidal terms are modulated by multiples of the angle $\theta$.

To pass to the wave frame, a change of basis is employed. The stiffness matrix in the wave frame is then:

$$K_O = \begin{bmatrix} \cos\theta & -\sin\theta \\ \sin\theta & \cos\theta \end{bmatrix} K_C \begin{bmatrix} \cos\theta & \sin\theta \\ -\sin\theta & \cos\theta \end{bmatrix} \quad \text{[Math. 21]}$$

The stiffness matrix $K_O$ has the same form as before, except that $\Delta K$ and Kxy and K also have more complex forms and depend on the angle $\theta$.

As indicated above, when the sensor is in operation, before trimming, it is possible to measure quadrature in the wave frame, which is expressed by the term $K_O(2,1)$, and it is possible to measure stiffness along the wave axis x', which is expressed by the term $K_O(1,1)$.

As indicated before, the excitation and trimming commands are determined in the wave frame but are applied in the sensor frame, but the aforementioned measurements are carried out in the wave frame.

However, the objective of the invention is to eliminate stiffness mismatch, i.e. to decrease $K_O(1,1)-K_O(2,2)$ to zero, and to eliminate quadrature, i.e. to decrease the terms $K_O(1,2)$ and $K_O(2,1)$ to zero. The problem is that it is possible to measure only $K_O(1,1)$ and $K_O(2,1)$ and not $K_O(2,2)$. There are therefore two equations for three unknowns and it is not possible to use a plurality of electrical angles since the terms of the equations vary as a function of said angle. The terms must then be re-projected into the sensor frame to determine the trimming corrections Ktx, Kty and Kq to be applied to cancel $\Delta K$ and Kxy.

The inventor has observed that, when the stiffness matrix $K_C$ is projected from the sensor frame to the wave frame to obtain $K_O$, the stiffness mismatch (Kx–Ky) appears in the term corresponding to the measurement of the quadrature in the wave frame and that it may be isolated. Likewise, the quadrature Kxy appears in the term corresponding to the measurement of stiffness along the axis x' of vibration and may be isolated, allowing the quadrature Kxy to be deduced. This is illustrated below with a few simple examples.

First example: a first stiffness matrix $K_{C1}$ in the sensor frame is considered, this matrix having the following form:

$$K_{C1} = \begin{bmatrix} a & 0 \\ 0 & b \end{bmatrix} \quad \text{[Math. 22]}$$

where a corresponds to Kx, and b corresponds to Ky.

In the wave frame the following is obtained:

$$K_{O1} = \begin{bmatrix} \frac{a+b}{2} + \frac{a-b}{2}\cos(2\theta) & \frac{a-b}{2}\sin(2\theta) \\ \frac{a-b}{2}\sin(2\theta) & \frac{a+b}{2} - \frac{a-b}{2}\cos(2\theta) \end{bmatrix} \quad \text{[Math. 23]}$$

It will be noted that the stiffness mismatch a–b appears in the term $K_{O1}(2,1)$ which represents the quadrature term in the wave frame, which term is:

$$\frac{a-b}{2}\sin(2\theta) \quad \text{[Math. 24]}$$

The desired unknown is (a–b) since $\theta$ is known.

Second example: a second stiffness matrix $K_{C2}$ in the sensor frame is now considered, this matrix having the following form:

$$K_{C2} = \begin{bmatrix} a\cos(2\theta) & 0 \\ 0 & b\cos(2\theta) \end{bmatrix} \quad \text{[Math. 25]}$$

where $a\cos(2\theta)$ corresponds to Kx, and $b\cos(2\theta)$ corresponds to Ky.

In the wave frame the following is obtained:

$$K_{O2} = \begin{bmatrix} \frac{a+b}{2}\cos(2\theta) + \frac{a-b}{4} + & \frac{a-b}{4}\sin(4\theta) \\ \frac{a-b}{4}\cos(4\theta) & \\ \frac{a-b}{4}\sin(4\theta) & \frac{a+b}{2}\cos(2\theta) - \frac{a-b}{4} - \\ & \frac{a-b}{4}\cos(4\theta) \end{bmatrix} \quad \text{[Math. 26]}$$

It may be seen that the stiffness mismatch $(a-b)\cos(2\theta)$ (the desired unknown being (a–b) since $\theta$ is known) appears in the term $K_{O2}(2,1)$, which is:

$$\frac{a-b}{4}\sin(4\theta) \quad \text{[Math. 27]}$$

Third example: a similar result may be observed for a third stiffness matrix $K_{C3}$ in the sensor frame of the following form:

$$K_{C3} = \begin{bmatrix} a\sin(2\theta) & 0 \\ 0 & b\sin(2\theta) \end{bmatrix} \qquad [\text{Math. 28}]$$

where $a\sin(2\theta)$ corresponds to Kx, and $b\sin(2\theta)$ corresponds to Ky.

In this case, the stiffness mismatch $(a-b)\sin(2\theta)$ appears in the term $K_{O3}(2,1)$, which is:

$$\frac{a-b}{4} - \frac{a-b}{4}\cos(4\theta) \qquad [\text{Math. 29}]$$

It is possible to determine $(a-b)$ since $\theta$ is known then to determine $(a-b)\sin(2\theta)$.

Fourth example: a fourth stiffness matrix $K_{C4}$ in the sensor frame is now considered, this matrix having the following form:

$$K_{C4} = \begin{bmatrix} 0 & c \\ c & 0 \end{bmatrix} \qquad [\text{Math. 30}]$$

where c corresponds to Kxy.

In the wave frame the following is obtained:

$$K_{O4} = \begin{bmatrix} -c\cdot\sin(2\theta) & c\cdot\cos(2\theta) \\ c\cdot\cos(2\theta) & c\cdot\sin(2\theta) \end{bmatrix} \qquad [\text{Math. 31}]$$

It may be seen that the quadrature c appears in the term $K_{O4}(1,1)$, namely $(-c\cdot\sin(2\theta))$, which represents the stiffness term in the wave frame; and c may be determined since $\theta$ is known.

Fifth example: a fifth stiffness matrix $K_{C5}$ in the sensor frame is now considered, this matrix having the following form:

$$K_{C5} = \begin{bmatrix} 0 & c\cdot\cos(2\theta) \\ c\cdot\cos(2\theta) & 0 \end{bmatrix} \qquad [\text{Math. 32}]$$

where $c\cdot\cos(2\theta)$ corresponds to Kxy.

In the wave frame the following is obtained:

$$K_{O5} = \begin{bmatrix} -\frac{c}{4}\sin(4\theta) & \frac{c}{4}+\frac{c}{4}\cos(4\theta) \\ \frac{c}{4}+\frac{c}{4}\cos(4\theta) & \frac{c}{4}\sin(4\theta) \end{bmatrix} \qquad [\text{Math. 33}]$$

It may be seen that the quadrature error $c\cdot\cos(2\theta)$ appears in the term $K_{O5}(1,1)$, which is $$-\frac{c}{4}\sin(4\theta) \qquad [\text{Math.34}]$$

It is possible to determine c since $\theta$ is known then to determine $c\cdot\cos(2\theta)$.

Sixth example: a sixth stiffness matrix $K_{C6}$ in the sensor frame is now considered, this matrix having the following form:

$$K_{C6} = \begin{bmatrix} 0 & c\cdot\sin(2\theta) \\ c\cdot\sin(2\theta) & 0 \end{bmatrix} \qquad [\text{Math.35}]$$

where $c\cdot\sin(2\theta)$ corresponds to Kxy.

In the wave frame the following is obtained:

$$K_{O6} = \begin{bmatrix} -\frac{c}{4}+\frac{c}{4}\cos(4\theta) & \frac{c}{4}\sin(4\theta) \\ \frac{c}{4}\sin(4\theta) & \frac{c}{4}-\frac{c}{4}\cos(4\theta) \end{bmatrix} \qquad [\text{Math.36}]$$

It may be seen that the quadrature error $c\cdot\sin(2\theta)$ appears in the term $K_{O6}(1,1)$, which is $$-\frac{c}{4}+\frac{c}{4}\cos(4\theta) \qquad [\text{Math.37}]$$

It is possible to determine c since $\theta$ is known then to determine $c\cdot\sin(2\theta)$.

In all the examples, it may be seen that it is thus possible to exploit the term $K_O(1,1)$ to determine the stiffness mismatch and/or to exploit the term $K_O(2,1)$ to determine the quadrature. More generally, it is possible to exploit one of the terms of the stiffness matrix in the wave frame to determine the stiffness mismatch and/or quadrature.

Generally, and as indicated above, the stiffness matrix is of more complex form in the sensor frame, i.e. it takes the form of a sum of $\cos(i\theta)$ and $\sin(i\theta)$ harmonics, i being an integer varying between 0 and n, n being greater than or equal to 1, as expressed in the formula Math. 20. Typically, n may be comprised between 2 and 4. It is then possible to decompose the stiffness matrix into a sum of various simpler matrices such as those of the four previous examples ($K_{C1}$, $K_{C2}$, $K_{C3}$, $K_{C4}$, $K_{C5}$, $K_{C6}$ ...), these matrices generally being weighted by values that may be considered to be constants. It is thus possible to express the stiffness error and/or quadrature in the form of a sum of terms, as explained below.

In each of the cases presented, the inventor has determined that by carrying out an analysis of the cosine and sine harmonics, which are dependent on the electrical angle $\theta$, of the terms representing stiffness and/or quadrature in the stiffness matrix in the wave frame, it is possible to deduce therefrom the stiffness mismatch and quadrature related to non-linearities in the sensor frame, by isolating the amplitudes of these terms.

According to the invention, a plurality of electrical angles are determined (applied and/or measured depending on whether the sensor is operating in gyrometer or gyroscope mode), to thus obtain an angle modulation. This may be done using continuous angle values $\theta(t)$ (the wave rotates continuously) or discontinuous angle values $\theta(t)$ (a plurality of angles $\theta_k$).

When the electrical angles of the wave have discontinuous values, the terms representative of quadrature and/or stiffness in the stiffness matrix in the wave frame are filtered, for example using a least squares filter, so as to isolate and recover the constants (amplitudes) of these terms.

When the wave rotates continuously, an anglewise demodulation may then be carried out—more precisely, the terms representative of quadrature and/or stiffness in the stiffness matrix in the wave frame are demodulated, the demodulation comprising applying a filter, for example a low-pass filter, allowing the constants (amplitudes) of the quadrature and/or of stiffness terms to be isolated and recovered. Said amplitudes allow the stiffness mismatch and quadrature to be deduced.

Figure 5:
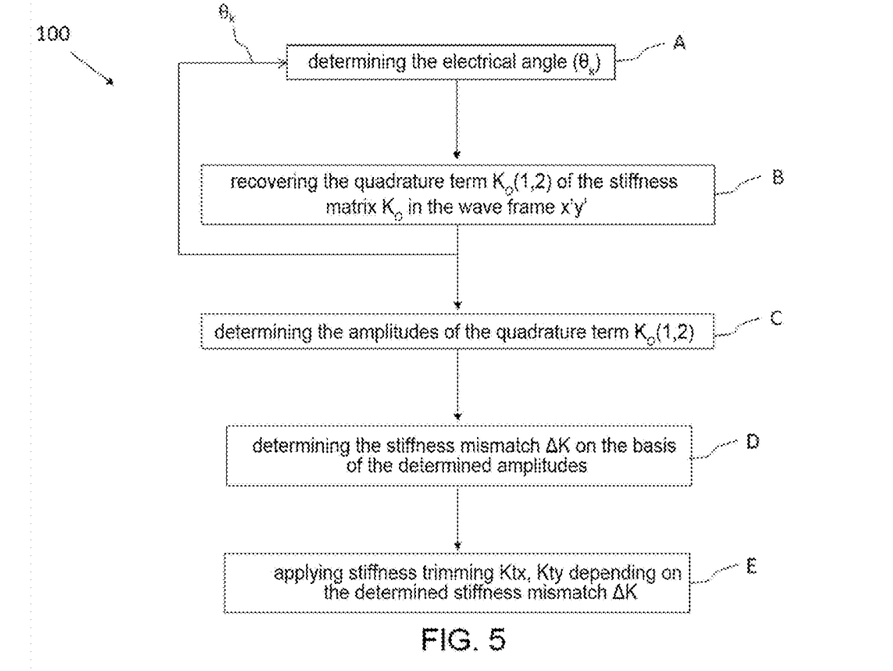
FIG. 5 illustrates a first embodiment of a calibrating method according to the invention.

FIG. 5 illustrates a first embodiment of the calibrating method of the invention, in which embodiment the following operations are carried out:
- A: determining (applying or measuring) the electrical angle ($\theta_k$);
- B: recovering the quadrature term $K_O(2,1)$ of the stiffness matrix $K_O$ in the wave frame x'y', said term taking the form of a sum of functions in $\cos(i\theta)$ and $\sin(i\theta)$, i being an integer varying between 1 and n, n being greater than or equal to 1; steps A and B being reiterated for a plurality of k electrical angles $\theta_k$, where k is an integer varying between 1 and m, m being greater than or equal to 2,
- C: determining the amplitudes of the functions in $\cos(i\theta)$ and $\sin(i\theta)$;
- D: determining the stiffness mismatch $\Delta K$ on the basis of the determined amplitudes; and
- E: applying stiffness trimming Ktx, Kty depending on the determined stiffness mismatch $\Delta K$.

Step C of determining amplitudes may be carried out by applying a least squares filter to the quadrature term $K_O(2, 1)$. In this case at least as many angles $\theta_k$ are required as there are amplitudes to be determined.

Figure 6:
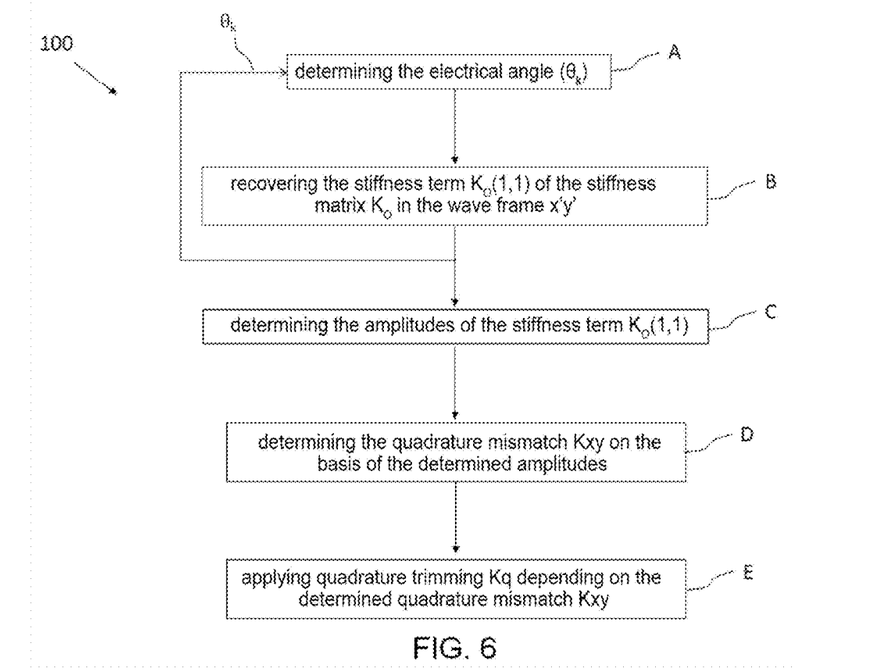
FIG. 6 illustrates a second embodiment of a calibrating method according to the invention.

FIG. 6 illustrates a second embodiment of the calibrating method of the invention, in which embodiment the following operations are carried out:
- A: determining (applying or measuring) the electrical angle ($\theta_k$);
- B: recovering the stiffness term $K_O(1,1)$ of the stiffness matrix $K_O$ in the wave frame x'y', said term taking the form of a sum of functions in $\cos(i\theta)$ and $\sin(i\theta)$, i being an integer varying between 1 and n, n being greater than or equal to 1; steps A and B being reiterated for a plurality of k electrical angles $\theta_k$, where k is an integer varying between 1 and m, m being greater than or equal to 2,
- C: determining the amplitudes of the functions in $\cos(i\theta)$ and $\sin(i\theta)$;
- D: determining the quadrature Kxy on the basis of the determined amplitudes; and
- E: applying quadrature trimming Kq depending on the determined quadrature Kxy.

Step C of determining amplitudes may be carried out by applying a least squares filter to the stiffness term $K_O(1,1)$. In this case at least as many angles $\theta_k$ are required as there are amplitudes to be determined.

Figure 7:
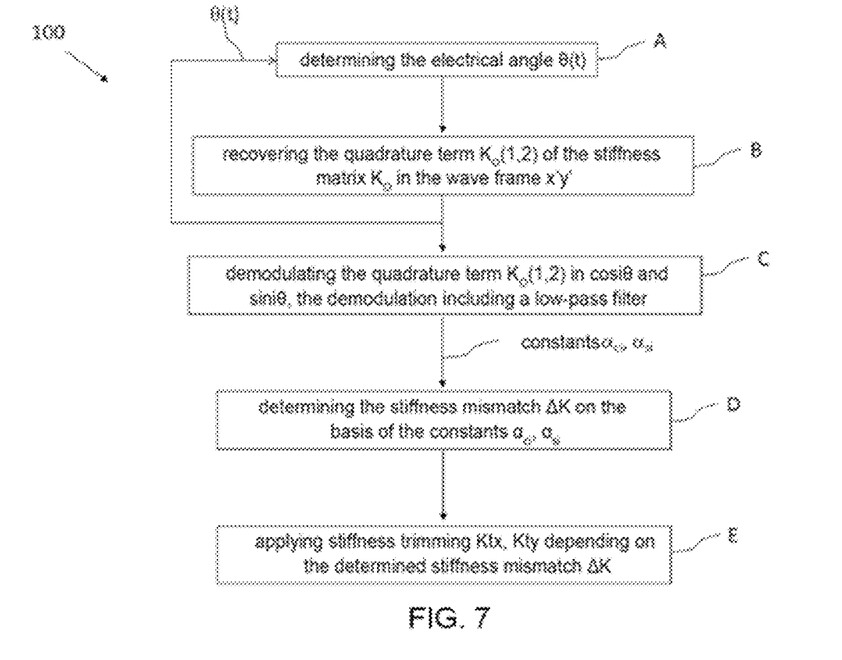
FIG. 7 illustrates a third embodiment of a calibrating method according to the invention.

Obviously, the calibrating methods according to the two embodiments of FIGS. 5 and 6 may be combined with each other in order to correct both the stiffness mismatch and the quadrature FIG. 7 illustrates a third embodiment of the calibrating method of the invention, in which embodiment the vibration wave rotates continuously and the following operations are carried out:
- A: determining (applying or measuring) the electrical angle $\theta(t)$;
- B: recovering the quadrature term $K_O(2,1)$ of the stiffness matrix $K_O$ in the wave frame x'y', said term taking the form of a sum of functions in $\cos(i\theta)$ and $\sin(i\theta)$, i being an integer varying between 1 and n, n being greater than or equal to 1; steps A and B being reiterated for a duration T, it thus being possible to:
- C: demodulate the quadrature term in $\cos(i\theta)$ and $\sin(i\theta)$ for each i varying between 1 and n, the demodulation including application of a low-pass filter, so as to determine the amplitudes of the functions in $\cos(i\theta)$ and $\sin(i\theta)$;
- D: determine the stiffness mismatch $\Delta K$ on the basis of the determined amplitudes; and
- E: apply stiffness trimming Ktx, Kty depending on the determined stiffness mismatch $\Delta K$.

The duration T may correspond to one revolution if the terms are in $\cos(i\theta)$ and $\sin(i\theta)$ as indicated above, or to half a revolution if alternatively the terms are in $\cos(2i\theta)$ and $\sin(2i\theta)$. The wave may for example rotate at a speed of 1° per second, although this is non-limiting.

The quadrature term $K_O(2,1)$ may be recovered as follows. The command Cq corresponds to the quadrature force Fq used to control the quadrature of the wave to within a known gain (called the scale factor) which corrects Ko(2, 1)·$x_0$, where $x_0$ is the amplitude of the wave. Thus, it is possible to obtain $K_O(2,1)$ via the formula:

$$K_O(2,1) = Fq/x_0 \quad \text{[Math. 38]}$$

Figure 8:
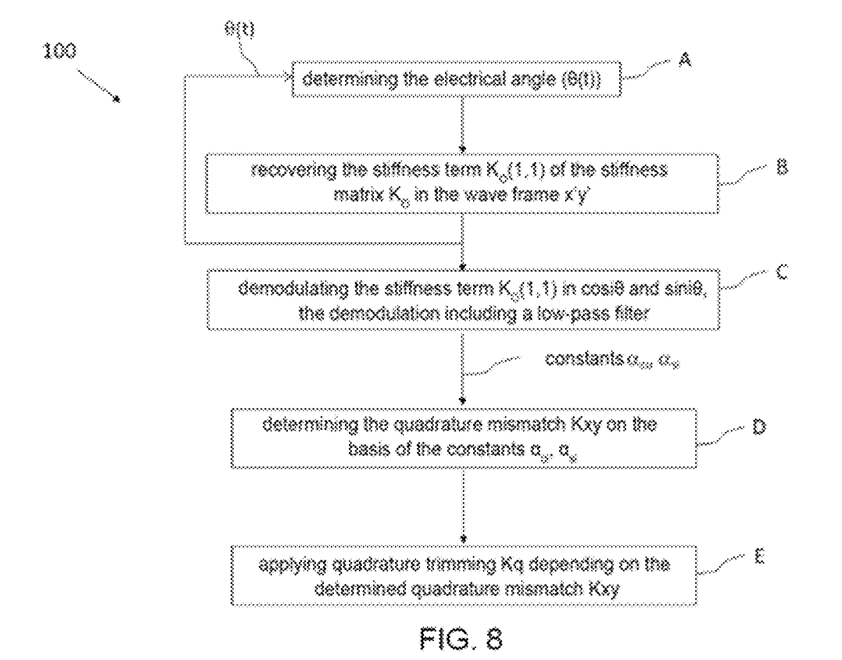
FIG. 8 illustrates a fourth embodiment of a calibrating method according to the invention.

FIG. 8 illustrates a fourth embodiment of the calibrating method of the invention, in which embodiment the vibration wave rotates continuously and the following operations are carried out:
- A: determining (applying or measuring) the electrical angle $\theta(t)$;
- B: recovering the stiffness term $K_O(1,1)$ of the stiffness matrix $K_O$ in the wave frame x'y', said term taking the form of a sum of functions in $\cos(i\theta)$ and $\sin(i\theta)$, i being an integer varying between 1 and n, n being greater than or equal to 1; steps A and B being reiterated for a duration T, it thus being possible to:
- C: demodulate the quadrature term in $\cos(i\theta)$ and $\sin(i\theta)$ for each i varying between 1 and n, the demodulation including application of a low-pass filter, so as to determine the amplitudes of the functions in $\cos(i\theta)$ and $\sin(i\theta)$;
- D: determine the quadrature Kxy on the basis of the determined amplitudes and
- E: apply quadrature trimming Kq depending on the determined quadrature Kxy.

The duration T may correspond to one revolution if the terms are in $\cos(i\theta)$ and $\sin(i\theta)$ as indicated above, or to half a revolution if alternatively the terms are in $\cos(2i\theta)$ and $\sin(2i\theta)$. The wave may for example rotate at a speed of 1° per second, although this is non-limiting.

The stiffness term $K_O(1,1)$ may be recovered through evaluation of the angular frequency of vibration ω of the wave:

$$KK_O(1,1) = M \times \omega^2 \quad \text{[Math. 39]}$$

where M is the mass and is known.

Obviously, the calibrating methods according to the two embodiments of FIGS. 7 and 8 may be combined with each other in order to correct both the stiffness mismatch and the quadrature.

In any one of these four embodiments, and generally in the calibrating method according to the invention, it is also possible to use the stiffness term $K_O(1,1)$ of the stiffness matrix in the wave frame to determine the stiffness mismatch and/or to use the quadrature term $K_O(2,1)$ of the stiffness matrix in the wave frame to determine the quadrature. More generally, it is possible to exploit any one of the terms of the stiffness matrix in the wave frame to determine the stiffness mismatch and/or quadrature.

In any one of these four embodiments, and generally in the calibrating method according to the invention, said method may be implemented while the inertial sensor is operating in gyrometer mode. The electrical angle $\theta_k$ or $\theta(t)$ determined in step A is in this case equal to an angle $\theta_{k\_imp}$ or $\theta(t)_{imp}$ imposed on the vibration via the precession command Cp. It is possible to use various values of $\theta_{k\_imp}$ or $\theta(t)_{imp}$ to average the errors, either via continuous rotation $\theta(t)_{imp}$, for example over one revolution or half a revolution (or a plurality of revolutions or half revolutions), or via discontinuous rotation, measurements for example being carrying out for $\theta_{k\_imp}$ equal to 30° then 60° then 90°. Steps A to B are implemented successively for each electrical angle $\theta_{k\_imp}$ or $\theta(t)_{imp}$.

Alternatively, the calibrating method may be implemented while the inertial sensor is operating in gyroscope mode. The electrical angle $\theta_k$ or $\theta(t)$ then results from a rotation of the inertial sensor and is measured by the latter. The electrical angle determined in step A is equal to the measured angle of rotation $\theta_{k\_m}$ or $\theta(t)_m$. Steps A to B are implemented successively for each electrical angle $\theta_{k\_m}$ or $\theta(t)_m$. The angle $\theta_{k\_m}$ may result from modifications associated with movements of the carrier, but also from modifications associated with a precession command.

Also alternatively, the calibrating method according to the invention may be implemented in a hybrid gyrometer/gyroscope mode.

Thus, the trimming commands are carried out by modifying the values of Ktx, Kty and Kq depending on the stiffness mismatch and quadrature determined depending on the electrical angle. This makes it possible to correct non-linearities.

It is thus possible to continuously determine the stiffness mismatch and quadrature, and to correct them by trimming. A closed loop may update the trimming matrix, i.e. the values Ktx, Kty and Kq, so as to continuously correct non-linearity errors. The corrections may also be applied in a set manner or even be applied only if they are higher than a predetermined threshold, this allowing the noise associated with application of closed-loop control to be decreased.

Steps A to E mentioned above may be implemented in a servo until $\Delta K$ and Kxy have decreased to zero.

Steps A to D of the calibrating method will now be illustrated for each of the first four examples given above. In the first three illustrated examples given, stiffness mismatch is determined, and in the fourth illustrated example given, quadrature is determined.

First Example

For the stiffness matrix $K_{O1}$ in the wave frame x'y' and for a plurality of electrical angles $\theta$:
A the electrical angle $\theta$ is determined;
B the term $K_{O1}(2,1)$ (which is equal to the term $K_{O1}(1,2)$) of the stiffness matrix in the wave frame x'y', i.e. Math. 24

$$\frac{a-b}{2}\sin(2\theta),$$

is recovered;
(N.B. in the stiffness matrix $K_{C1}$ in the sensor frame, a corresponds to Kx and b corresponds to Ky); then
C the term $K_{O1}(1,2)$ in $\sin(2\theta)$ is demodulated and the following is obtained:

$$\frac{a-b}{4} - \frac{a-b}{2}\sin(4\theta); \quad [\text{Math.40}]$$

then, with a low-pass filter, the constant (the amplitude) is obtained: (a–b)/4;
D therefore, Kx–Ky, which is equal to 4 times (a–b)/4, is deduced.

Second Example

For the stiffness matrix $K_{O2}$ in the wave frame x'y' and for a plurality of electrical angles $\theta$:
A the electrical angle $\theta$ is determined;
B the term $K_{O2}(2,1)$ (which is equal to the term $K_{O2}(1,2)$) of the stiffness matrix in the wave frame x'y', i.e. Math. 27

$$\frac{a-b}{4}\sin(4\theta),$$

is recovered;
(N.B. in the stiffness matrix $K_{C2}$ in the sensor frame, a $\cos(2\theta)$ corresponds to Kx and b $\cos(2\theta)$ corresponds to Ky); then
C the term $K_{O1}(1,2)$ in $\sin(2\theta)$ is demodulated and the following is obtained:

$$\frac{a-b}{8} - \frac{a-b}{8}\sin(8\theta); \quad [\text{Math.41}]$$

then, with a low-pass filter, the constant (the amplitude) is obtained: (a–b)/8,
D therefore, Kx–Ky, which is equal to 8 times (a–b)/8 multiplied by $\cos(2\theta)$, is deduced.

Third Example

For the stiffness matrix $K_{O3}$, the result differs in that it is necessary to multiply by $\sin(2\theta)$ and not by $\cos(2\theta)$.

Fourth Example

For the stiffness matrix $K_{O4}$ in the wave frame x'y' and for a plurality of electrical angles $\theta$:
A the electrical angle $\theta$ is determined;
B the term $K_{O4}(1,1)$ of the stiffness matrix in the wave frame x'y' is recovered, namely: $-c\cdot\sin(2\theta)$;
(N.B. in the stiffness matrix $K_{C4}$ in the sensor frame, c corresponds to Kxy); then
C the term $K_{O4}(1,1)$ in $\sin(2\theta)$ is demodulated and the following is obtained:

$$-\frac{c}{2} + \frac{c}{2}\sin(4\theta); \quad [\text{Math.42}]$$

then, with a low-pass filter, the constant (the amplitude) is obtained: $-c/2$;
D therefore, Kxy, which is equal to $-c/2$ times $(-2)$, is deduced.

The same logic is applicable to the fifth and sixth examples.

In the fifth example, the term $K_{O5}(1,1)$ of the stiffness matrix in the wave frame x'y', i.e. Math. 34

$$-\frac{c}{4}\sin(4\theta)$$

is recovered;
this term is demodulated in sin 4θ and filtered to extract the constant (the amplitude) c, which may then be multiplied by cos 2θ.

In the sixth example, the term $K_{O6}(1,1)$ of the stiffness matrix in the wave frame x'y', i.e. Math. 37

$$-\frac{c}{4} + \frac{c}{4}\cos(4\theta)$$

is recovered, demodulated in cos 4θ and filtered to extract the constant (the amplitude) c, which may then be multiplied by sin 2θ.

As indicated above, when the stiffness matrix is of more complex form, i.e. when it takes the form of a sum of cos(iθ) and sin(iθ) harmonics, i being an integer varying between 1 and n, n being greater than or equal to 1, it is possible to decompose the stiffness matrix $K_C$ into a sum of various simpler matrices such as those ($K_{C1}$, $K_{C2}$, $K_{C3}$, $K_{C4}$, $K_{C5}$, $K_{C6}$ ...) described above, which sum is generally weighted by values that may be considered to be constants. Thus, the stiffness error and/or quadrature error corresponds to the sum of the terms determined in the various step Ds for each of the simple matrices.

One alternative is to exploit the term $K_O(1,1)$ to determine the stiffness mismatch, and/or to exploit the term $K_O(2,1)$ to determine the quadrature, as should be clear from the various examples. For example:

In the second example:

$$K_{C2} = \begin{bmatrix} a\cos(2\theta) & 0 \\ 0 & b\cos(2\theta) \end{bmatrix} \quad [\text{Math.25}]$$

converts to:

$$K_{O2} = \begin{bmatrix} \frac{a+b}{2}\cos(2\theta) + & \frac{a-b}{4}\sin(4\theta) \\ \frac{a-b}{4} + \frac{a-b}{4}\cos(4\theta) & \\ \frac{a-b}{4}\sin(4\theta) & \frac{a+b}{2}\cos(2\theta) - \\ & \frac{a-b}{4} - \frac{a-b}{4}\cos(4\theta) \end{bmatrix} \quad [\text{Math.26}]$$

It may be seen that it is also possible to use the term $K_{O2}(1,1)$ to determine (a–b).

In the fourth example:

$$K_{C4} = \begin{bmatrix} 0 & c \\ c & 0 \end{bmatrix} \quad [\text{Math.30}]$$

converts to:

$$K_{O4} = \begin{bmatrix} -c.\sin(2\theta) & c.\cos(2\theta) \\ c.\cos(2\theta) & c.\sin(2\theta) \end{bmatrix} \quad [\text{Math.31}]$$

It is also possible to use the term $K_{O4}(2,1)$ to determine c.

Thus, the invention uses trimming transducers to correct stiffness mismatch and quadrature and above all the invention exploits the fact that harmonics are transformed on passing from the sensor frame to the wave frame, and that thus the stiffness mismatch and quadrature appear in one or more of the terms of the stiffness matrix in the wave frame, in some form. As quadrature and stiffness are determinable without having to apply any disturbance, it is possible to observe and correct in real time both quadrature and stiffness mismatch, without disturbing the sensor with a disturbance that could end up in the measurement delivered by the sensor.

The various described embodiments may be combined with one another.

Furthermore, the present invention is not limited to the embodiments described above but encompasses any embodiment falling within the scope of the claims.

The invention claimed is:

1. A method for calibrating a stiffness mismatch ΔK and/or a quadrature Kxy of a vibrating inertial angular sensor, the inertial sensor comprising a resonator (Res) extending about two mutually perpendicular axes x and y defining a sensor frame xy and comprising:

at least one vibrating proof mass (M1), said at least one proof mass comprising at least two parts configured to vibrate in phase opposition with respect to each other at a vibration angular frequency (ω) and in a direction x' defining a wave frame x'y', a vibration wave (OV) along x' making an electrical angle (θ) to the axis x;

a plurality of electrostatic transducers controlled by electrical voltages and operating along the two axes x or y, including at least:

a pair of detection transducers (Dx, Dy) configured to detect the movements of the vibration wave along the axis x and the axis y;

a pair of excitation transducers (Ex, Ey) to which excitation forces are applied along the axis x and the axis y, respectively, via a plurality of excitation commands determined by servos on the basis of the detected movements, these being configured to maintain the wave at a constant amplitude via an amplitude command (Ca) and, where appropriate, to rotate said vibration wave via a precession command (Cp) and a command (Cq) for controlling the quadrature of the wave;

a pair of quadrature compensation transducers (Q+, Q−), controlled via a quadrature command (CTq); and a pair of stiffness adjustment transducers (Tx, Ty), controlled via a stiffness command (CTx) setting stiffness along the axis x and a stiffness command (CTy) setting stiffness along the axis y, respectively, forming a stiffness command (CTf);

the resonator (Res) having a stiffness matrix $K_C$ in the sensor frame and a stiffness matrix $K_O$ in the wave frame;

the calibrating method being applied when the inertial sensor is in operation with a vibration wave (OV) vibrating in the direction x';

the calibrating method comprising the steps of:

A determining an electrical angle ($\theta_k$, θ(t));

B recovering at least one term of the stiffness matrix $K_O$ in the wave frame x'y', which may be a quadrature term $K_O(2,1)$ or a stiffness term $K_O(1,1)$, said term taking the form of a sum of functions in cos(iθ) and sin(iθ), i being an integer varying between 1 and n, n being greater than or equal to 1;

steps A and B being reiterated either for a plurality of electrical angles ($\theta_k$), where k is an integer varying between 1 and m, m being greater than or equal to 2, or for a duration (T) during which the vibration wave (OV) rotates continuously through an electrical angle (θ(t)) varying as a function of time (t); then C determining amplitudes of the functions in cos(iθ) and sin(iθ); and D determining the stiffness mismatch ΔK and the quadrature Kxy, respectively, on the basis of the determined amplitudes.

2. The calibrating method as claimed in claim 1, the electrical angle describing a plurality of electrical angles ($θ_k$) where k is an integer varying between 1 and m, m being greater than or equal to 2, step C of determining amplitudes comprising applying a least squares filter to the recovered term, a quantity (m) of electrical angles ($θ_k$) being at least equal to the number of amplitudes to be determined.

3. The calibrating method as claimed in claim 1, the vibration wave (OV) continuously rotating through an electrical angle (θ(t)) varying as a function of time (t) for a duration (T), step C of determining amplitudes comprising demodulating the recovered term in cos(iθ) and sin(iθ) for each i varying between 1 and n, so as to determine the amplitudes of the functions in cos(iθ) and sin(iθ); and step D of determining the stiffness mismatch ΔK and the quadrature Kxy, respectively, is carried out on the basis of the determined amplitudes.

4. The calibrating method as claimed in claim 1, wherein the inertial sensor operates in gyrometer mode, the electrical angle ($θ_k$, (θ(t)) determined in step A being equal to an imposed angle ($θ_{k\_imp}$, (θ(t) imp) set via the precession command (Cp).

5. The calibrating method as claimed in claim 1, wherein the inertial sensor operates in gyroscope mode, the electrical angle ($θ_k$, (θ(t)) resulting from a rotation of the inertial sensor being measured by said inertial sensor, potentially superimposed on a precession command (Cp), the electrical angle determined in step A being equal to said measured angle of rotation ($θ_{k\_m}$, (θ(t)m).

6. The calibrating method as claimed in claim 1, further comprising an additional step of:

E applying a stiffness command (CTf) and a quadrature command (CTq), respectively, on the basis of the stiffness mismatch ΔK and the quadrature Kxy determined in step D, respectively.

7. The calibrating method as claimed in claim 6, steps A to E being able to be included in a closed loop servo or being able to be implemented in open loop iteratively.

8. An inertial angular sensor comprising a resonator (Res) extending about two mutually perpendicular axes x and y defining a sensor frame xy, and comprising:

at least one vibrating proof mass (M1), said at least one proof mass comprising at least two parts configured to vibrate in phase opposition with respect to each other at a vibration angular frequency (ω) and in a direction x' defining a wave frame x'y', the vibration wave (OV) along x' making an electrical angle (θ) to the axis x;

a plurality of electrostatic transducers controlled by electrical voltages and operating along the two axes x or y, including at least:

a pair of detection transducers (Dx, Dy) configured to detect the movements of the vibration wave along the axis x and the axis y;

a pair of excitation transducers (Ex, Ey) to which excitation forces are applied along the axis x and the axis y, respectively, via a plurality of excitation commands determined by servos on the basis of the detected movements, these being configured to maintain the wave at a constant amplitude via an amplitude command (Ca) and to rotate said vibration wave via a precession command (Cp) and a command (Cq) for controlling the quadrature of the wave;

a pair of quadrature compensation transducers (Q+, Q−), controlled via a quadrature command (CTq); and a pair of stiffness adjustment transducers (Tx, Ty), controlled via a stiffness command (CTx) setting stiffness along the axis x and a stiffness command (CTy) setting stiffness along the axis y, respectively, thus forming a stiffness command (CTf), the resonator (Res) having a stiffness matrix Kc in the sensor frame and a stiffness matrix $K_O$ in the wave frame;

the inertial angular sensor further comprising:

a means for determining the electrical angle ($θ_k$, θ(t));

a means for recovering at least one term of the stiffness matrix $K_O$ in the wave frame x'y', which may be a quadrature term $K_O(2,1)$ or a stiffness term $K_O(1,1)$; and a processing unit (UT) configured to implement at least steps A to D of the calibrating method according to claim 1;

the stiffness adjustment transducers (Tx, Ty) and quadrature bias compensation transducers (Q+, Q−), respectively, being configured to apply said stiffness command (CTf) and said quadrature command (CTq), respectively, to the resonator.

9. The inertial angular sensor as claimed in claim 8, said inertial sensor being axisymmetric.

10. The inertial angular sensor as claimed in claim 8, comprising at least two vibrating proof masses (M1, M2) forming the at least two parts configured to vibrate in phase opposition with respect to each other.

11. A method for measuring an angular velocity or an angular orientation of a carrier on which is arranged an inertial sensor as claimed in claim 8, the measuring method comprising:

calibrating a stiffness mismatch ΔK and/or a quadrature Kxy of said inertial sensor, the calibrating being applied when the inertial sensor is in operation with a vibration wave (OV) vibrating in the direction x';

the calibrating comprising the steps A to D of the calibrating method;

and, said calibrating further comprising:

measuring angular velocity or angular orientation, and the inertial sensor being used in gyrometer mode or in gyroscope mode.

* * * * *

UNITED STATES PATENT AND TRADEMARK OFFICE
CERTIFICATE OF CORRECTION

PATENT NO. : 12,332,080 B2
APPLICATION NO. : 18/029890
DATED : June 17, 2025
INVENTOR(S) : Nicolas Vercier et al.

Page 1 of 1

It is certified that error appears in the above-identified patent and that said Letters Patent is hereby corrected as shown below:

In the Claims

In Claim 11, Column 24, Line 48, "mismatch AK and/or" should be -- mismatch $\Delta K$ and/or --.

Signed and Sealed this
Fifth Day of August, 2025

Coke Morgan Stewart
*Acting Director of the United States Patent and Trademark Office*